US008125950B2

(12) United States Patent
Rofougaran et al.

(10) Patent No.: US 8,125,950 B2
(45) Date of Patent: Feb. 28, 2012

(54) APPARATUS FOR WIRELESSLY MANAGING RESOURCES

(75) Inventors: Ahmadreza (Reza) Rofougaran, Newport Coast, CA (US); Timothy W. Markison, Lahaina, HI (US)

(73) Assignee: Broadcom Corporation, Irvine, CA (US)

( * ) Notice: Subject to any disclaimer, the term of this patent is extended or adjusted under 35 U.S.C. 154(b) by 487 days.

(21) Appl. No.: 12/475,504

(22) Filed: May 30, 2009

(65) Prior Publication Data

US 2009/0239480 A1  Sep. 24, 2009

Related U.S. Application Data

(63) Continuation-in-part of application No. 11/700,285, filed on Jan. 31, 2007.

(51) Int. Cl.
*H04W 4/00* (2009.01)
(52) U.S. Cl. ...................................... 370/329
(58) Field of Classification Search .................. None
See application file for complete search history.

(56) References Cited

U.S. PATENT DOCUMENTS

| | | | |
|---|---|---|---|
| 4,807,183 A | 2/1989 | Kung |
| 5,502,683 A | 3/1996 | Marchioro |
| 5,754,948 A | 5/1998 | Metze |
| 5,786,912 A | 7/1998 | Kartalopoulos |
| 5,809,321 A | 9/1998 | Hansen |
| 5,884,104 A | 3/1999 | Chase |
| 6,182,203 B1 | 1/2001 | Simar |
| 6,234,900 B1 | 5/2001 | Cumbers |
| 6,438,622 B1 | 8/2002 | Haghighi et al. |
| 6,500,070 B1 | 12/2002 | Tomizawa |
| 6,663,295 B2 | 12/2003 | Kami |
| 6,735,663 B2 | 5/2004 | Watts, Jr. et al. |
| 6,735,708 B2 | 5/2004 | Watts, Jr. |
| 6,801,974 B1 | 10/2004 | Watts, Jr. et al. |
| 6,816,925 B2 | 11/2004 | Watts, Jr. |
| 7,065,326 B2 | 6/2006 | Lovberg |
| 7,082,285 B2 | 7/2006 | Linde |
| 7,149,837 B2 | 12/2006 | Watts, Jr. et al. |
| 7,159,099 B2 | 1/2007 | Lucas |
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |

(Continued)

FOREIGN PATENT DOCUMENTS

EP     1499070 A2    1/2005

(Continued)

OTHER PUBLICATIONS

Bruce K Gale, "RF, Electrical, and Magnetic Microsystems," date unknown, 8 pages.

(Continued)

*Primary Examiner* — Jianye Wu
(74) *Attorney, Agent, or Firm* — Garlick Harrison & Markison; Bruce E. Garlick

(57) ABSTRACT

An integrated circuit includes a millimeter wave transceiver and may include memory and processing resources, each with an associated millimeter wave transceiver. Intra-IC millimeter wave communication links, between resources on a given IC, enables IC-level resource sharing and Inter-IC millimeter wave communication links, between resources on different ICs, enables cross-IC-level resource sharing. A resource sharing method allocates IC resources to tasks based on task requirements, resource capabilities, and resource availability.

21 Claims, 7 Drawing Sheets

U.S. PATENT DOCUMENTS

| | | |
|---|---|---|
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1* | 5/2002 | Thi et al. .......... 370/352 |
| 2002/0107010 A1* | 8/2002 | Witte et al. .......... 455/418 |
| 2002/0164945 A1 | 11/2002 | Olsen |
| 2003/0001882 A1 | 1/2003 | Macer et al. |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchimyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1* | 8/2003 | LeCren .......... 455/67.1 |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1* | 2/2006 | Turner et al. .......... 343/742 |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1* | 8/2006 | Chauve et al. .......... 711/154 |
| 2006/0203758 A1 | 9/2006 | Tee et al. |
| 2006/0252470 A1 | 11/2006 | Seshadri |
| 2006/0260546 A1* | 11/2006 | Usami .......... 118/722 |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Borckmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2009/0006640 A1 | 1/2009 | Brouwer |
| 2009/0198854 A1 | 8/2009 | Rofougaran |
| 2009/0207090 A1* | 8/2009 | Pettus et al. .......... 343/873 |
| 2009/0215533 A1 | 8/2009 | Zalewski et al. |
| 2010/0146199 A1 | 6/2010 | Shaeffer |

FOREIGN PATENT DOCUMENTS

| | | |
|---|---|---|
| WO | 2009002464 A2 | 12/2008 |

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, Jun. 2, 2008, pp. 5.

Haworth, et al.; Public Security Screening for Metallic Objects with Millimetre-Wave Images; Heriot-Watt University; United Kingdom; pp. 1-4.

Elsadek, et al.; "A Compact 3-D Microwave Holographic Pointer System Using a Size Reduced Microstrip Planar Array"; Department of Electrical and Computer Engineering; University of California; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4.

E3 Wii Controller; Nintendo Wilmote; Technology Limitations; XGAMING, Inc.; pp. 1-5.

* cited by examiner

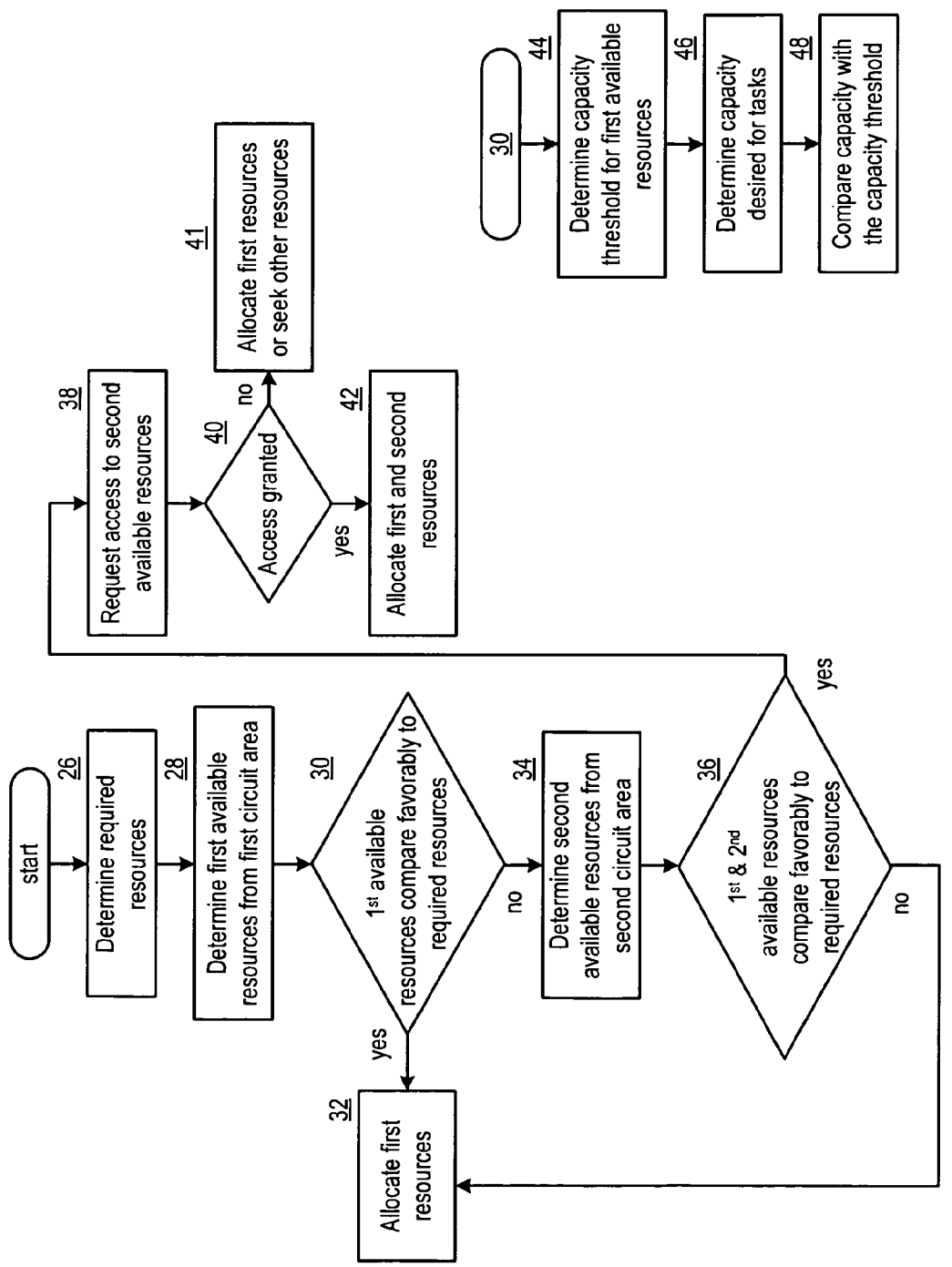

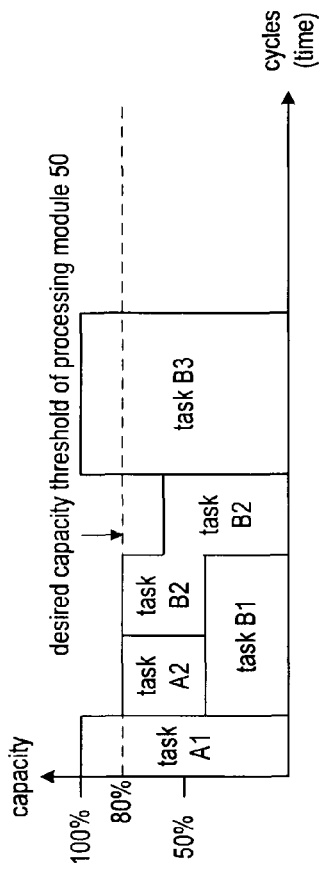

FIG. 6
task allocation to processing module (no offloading)

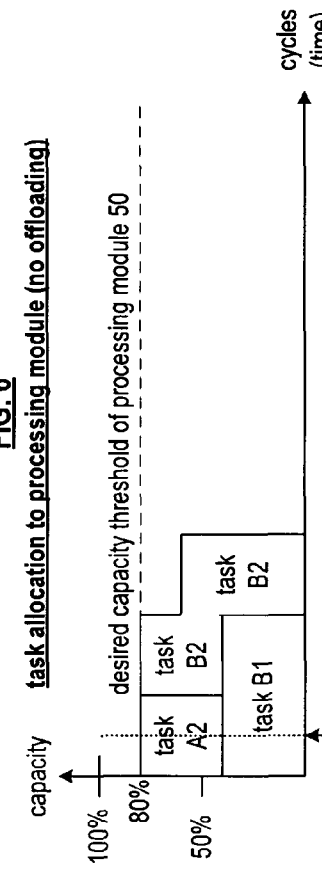

FIG. 7
task allocation to processing module (with offloading)

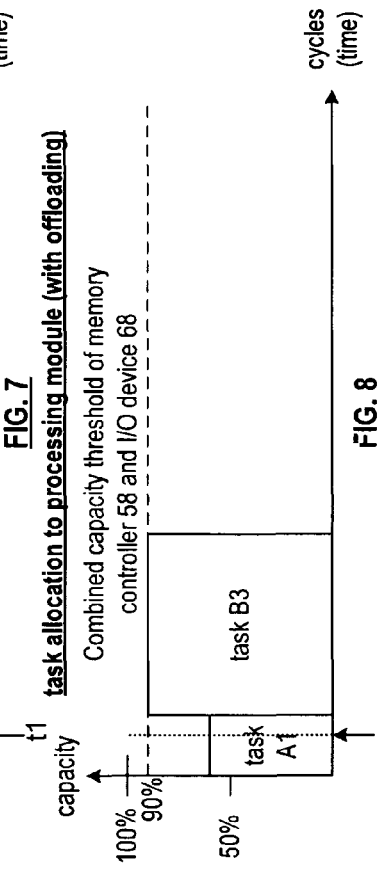

FIG. 8
task allocation to other device(s)

Required Resources by Task Table 1

| Task type | Processor cycles | Memory bytes | Parallel or Serial Inst. |
|---|---|---|---|
| A1 | 1.3M | 100M | S |
| A2 | 10M | 1.1G | P |
| B1 | 20M | 5M | P |
| B2 | 25M | 7M | P |
| B3 | 30M | 9M | S |
| ... | | | |

Resource Capabilities Table 2

| Resource | Processor Speed | Memory Size bytes |
|---|---|---|
| 50-52 | - | 1G |
| 50-51 | 2G cps | - |
| 56-55 | - | 32G |
| 58-54 | - | 2G |
| 58-53 | 3.3G cps | - |
| ... | | |

Resource Allocations at t1 Table 3

| Resource | Tasks | Status | Cycles to completion |
|---|---|---|---|
| 70-71 | none | Idle | 0 |
| 58-53 | A1 | Run | 425k |
| 50-51 | B1 | Run | 12.2M |
| 50-51 | A2 | Run | 5.01M |
| 68-67 | B3 | Run | 26.45M |
| 50-51 | B2 | Queued | -- |

FIG. 5

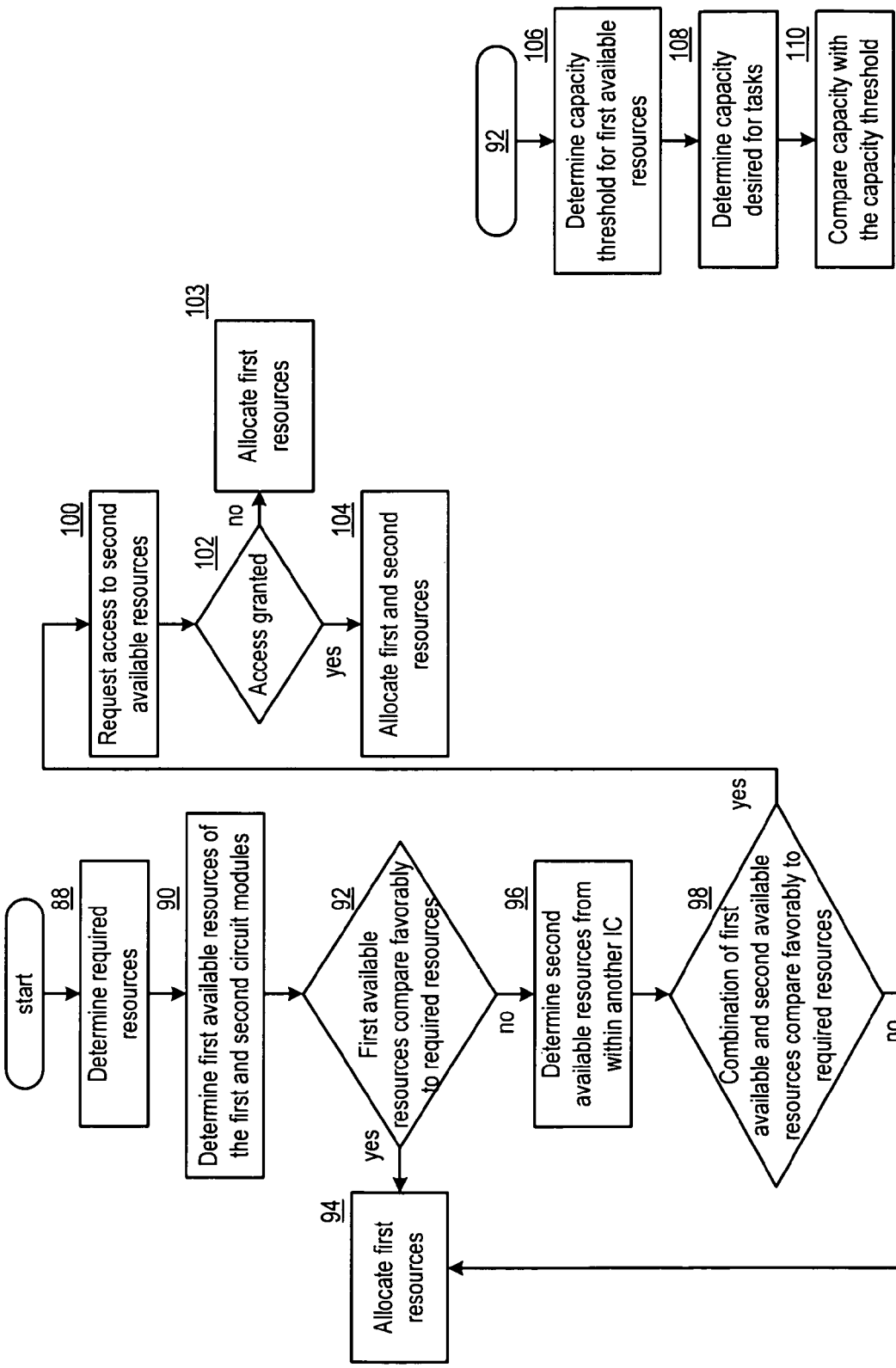

APPARATUS FOR WIRELESSLY MANAGING RESOURCES

This patent application is claiming priority under 35 USC §120 as a continuation in part patent application of co-pending patent application entitled RF BUS CONTROLLER, having a filing date of Jan. 31, 2007, and a Ser. No. of 11/700,285.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communications and more particularly to managing resources utilizing wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, IEEE 802.15.4, Bluetooth, global system for mobile communications (GSM), enhanced data rates for GSM evolution (EDGE), universal mobile telecommunications system (UMTS), long term evolution (LTE), IEEE 802.16, evolution data optimized (EV-DO), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Many of the communication devices include a similar basic architecture: that being a processing core, memory, and peripheral devices. The memory stores operating instructions that the processing core uses to generate data, which may also be stored in the memory. The peripheral devices allow a user of the communication device to direct the processing core as to which programs and hence which operating instructions to execute, to enter data, etc. and to see the resulting data. For example, a cellular telephone includes a keypad, a display, a microphone and a speaker for such functions. Typically the processing core, memory and other elements of the communication device are implemented in one or more integrated circuits (IC) that are inter-coupled by traces on common printed circuit boards. The interconnections carry control and content messages between the ICs to enable the device to fulfill its function.

A typical IC includes components (e.g. transistors, capacitors, resistors, and inductors) configured to form a plurality of circuits (e.g. logic gates, flip-flops, multiplexers, amplifiers, and other circuits). Combinations of the circuits can produce modules such as a memory array, a microprocessor, and others. In a typical IC, communications between modules and/or circuits are limited due to the internal wired interconnections and communications between ICs are limited due to the external wired connections between them.

The limitations of internal IC interconnects and the IC-to-IC connections produce a silo effect of task execution (e.g., certain tasks are performed by certain circuits and/or modules of an IC). The silo effect inhibits efficient use of the device's IC resources resulting in uneven resource utilization between and within ICs. As a result, some ICs may have overloaded resources while others are under-utilized.

Therefore, a need exists for a communications mechanism that will facilitate better utilization of IC resources.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIGS. 2 and 3 are logic diagrams of embodiments of methods for sharing resources in accordance with the invention;

FIG. 5 is an example of a set of tables used for sharing resources in accordance with the invention;

FIG. 6 is a diagram of an example embodiment of task allocation in accordance with the invention;

FIG. 7 is a diagram of an example of another embodiment of task allocation in accordance with the invention;

FIG. 8 is a diagram of an example of another embodiment of task allocation in accordance with the invention;

FIGS. 11 and 12 are logic diagrams of other embodiments of methods for sharing resources in accordance with the invention.

DETAILED DESCRIPTION OF THE INVENTION

Figure 1:
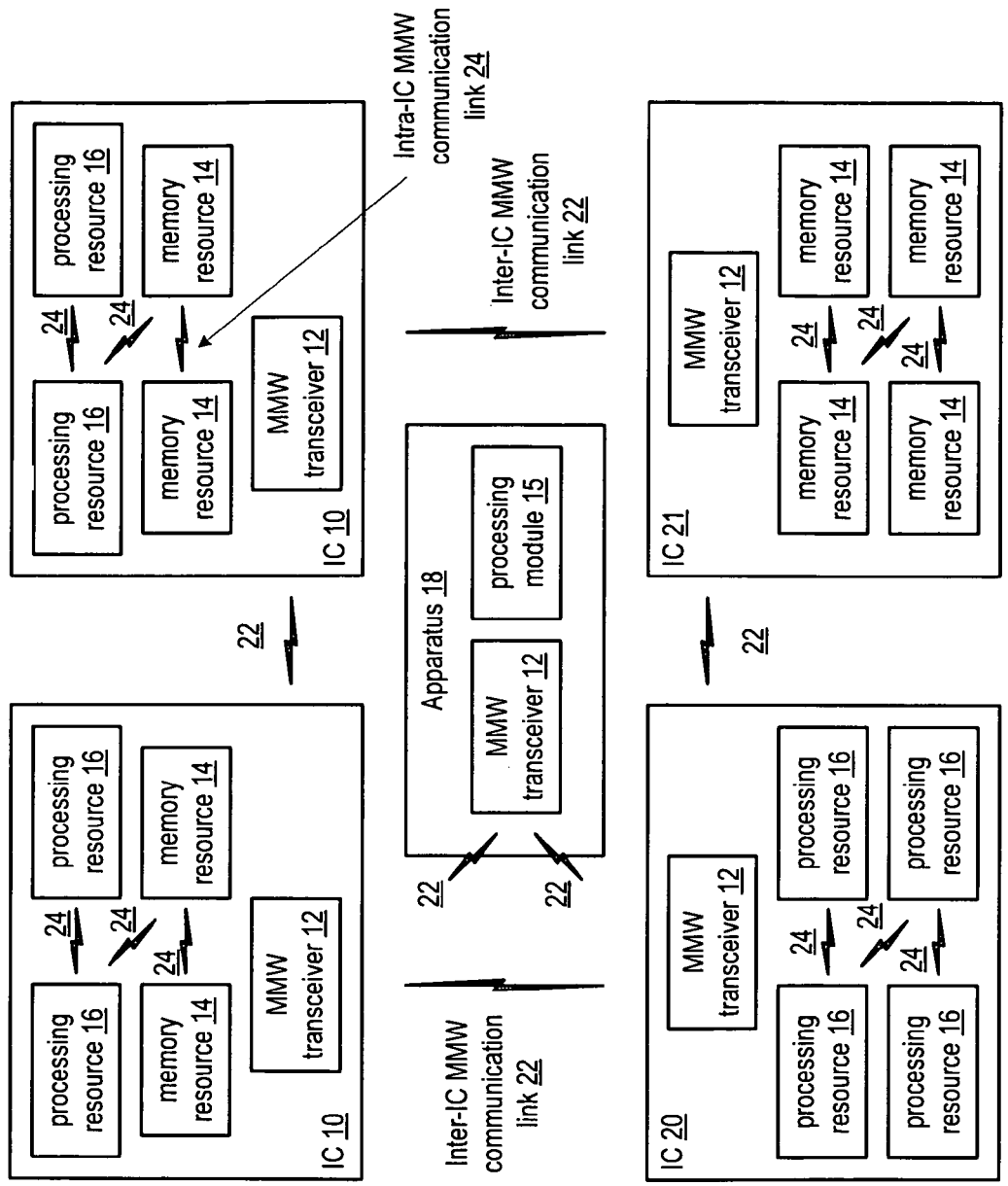
FIG. 1 is a schematic block diagram of an embodiment of one or more devices in accordance with the invention.

FIG. 1 is a schematic block diagram of an embodiment of a plurality of integrated circuits (ICs) 10-21 and an apparatus 18. The apparatus 18 includes a millimeter wave (MMW) transceiver 12 and a processing module 15. Each of the ICs 10-21 includes a plurality of resources 14-16 and at least one MMW transceiver 12. In this embodiment, the ICs 10-21 are in close proximity (e.g. within a few meters of each other) and may be part of the same device or distributed among different devices. A device may be a portable device or a fixed device. For example, a portable device may be a cell phone, a personal digital assistant, a digital music player, a digital video player, a laptop computer, a handheld computer, a video game controller, and/or any other portable equipment that includes integrated circuits. A fixed device may be a personal computer, a cable set-top box, a satellite receiver, a television set, a printer, a fax machine, home entertainment equipment, a video game console, and/or any type of home or office equipment that includes integrated circuits.

The processing module 15 may be a microprocessor, microprocessor array, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

The plurality of resources included in each of the ICs 10-21 may be a plurality of memory resources 14 and/or a plurality of processing resources 16. For example, IC 10 includes a plurality of memory resources 14, a plurality of processing resources 16, and at least one MMW transceiver 12. As another example, IC 20 includes a plurality of processing resources 16 and at least one MMW transceiver. As yet another example, IC 21 includes a plurality of memory resources 14 and at least one MMW transceiver 12.

A processing resource 16 may be a microprocessor, microprocessor array, micro-controller, digital signal processor, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing resource may have an associated memory and/or memory element, which may be a single memory device, a plurality of memory devices, and/or embedded circuitry of the processing resource. Such a memory device may be a read-only memory, random access memory, volatile memory, non-volatile memory, static memory, dynamic memory, flash memory, cache memory, and/or any device that stores digital information. Note that when the processing resource implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

A memory resource 14 may be a read-only memory, random access memory, volatile memory, non-volatile memory, static memory, dynamic memory, flash memory, cache memory, and/or any device that stores digital information.

In an example of operation, the apparatus 18 communicates with one or more of the ICs 10-21 to coordinate usage of the ICs' processing resources 16 and/or memory resources 14 via the MMW transceivers 12. In this regard, the processing module 15 of the apparatus 18 determines what resources are required for upcoming tasks, determines available resources within ICs 10-21, and allocates the resources that will support the tasks in a desired way. The apparatus 18 and the ICs communicate resource availability information and resource allocation information via messages conveyed over inter-IC MMW communication links 22 and/or intra-IC MMW communication links 24, which are supported by the MMW transceivers 12. An inter-IC message may include a request for resource availability information from one or more ICs, a request for the allocation of a resource from one or more ICs, resource availability information of one or more ICs, a resource request grant for a resource of one or more ICs, and/or data used and/or produced by a resource of one or more of the ICs. An intra-IC message may include a request for resource availability information regarding one or more resources within an IC, a request for the allocation of one or more resources within an IC, resource availability information within an IC, a resource request grant for resources within an IC, and/or data used and/or produced by one or more resources within an IC.

As an example, one or more of the processing resources 16 of one of the ICs 10 has a plurality of upcoming tasks (e.g., execute one or more operation instructions of an algorithm, perform an interrupt, perform a co-processing function, process data, store data to memory, read data from memory, etc.) The one or more processing resources 16 communicates its upcoming tasks to the apparatus 18, which may be a single device implemented as a stand-alone IC or implemented within one of the ICs 10-21 or a distributed device with components (e.g., separate processing module and MMW transceiver) implemented within two or more of the ICs 10-21.

The one or more processing resources 16 may communicate its upcoming tasks via a MMW message. For instance, the one or more processing resources 16, or a designated representative thereof (e.g., one of the processing resources or an IC resource control module assigned to facilitate resource sharing), generates a message containing the upcoming tasks. The message identifies the particular tasks and may further include the requirements for performing the task (e.g., processing requirements and/or memory requirements). The message is conveyed to an associated MMW transceiver 12.

The millimeter wave (MMW) transceiver 12 may include a baseband processing module, one or more receiver sections, and one or more transmitter sections, where the transmitter and receiver sections may share one or more antennas or each may have its own one or more antennas. In this example, the baseband processing module converts outbound data (e.g., the message) into an outbound symbol stream in accordance with a data modulation scheme and a channel usage scheme. The data modulation scheme may be binary phase shift keying (BPSK), quadrature phase shift keying (QPSK), frequency shift keying (FSK), minimum shift keying (MSK), amplitude shift keying (ASK), quadrature amplitude modulation (QAM), a combination thereof, and/or variations thereof. The channel usage scheme may be time division multiple access (TDMA), frequency divisional multiple access (FDMA), code division multiple access (CDMA), orthogonal frequency division multiplexing (OFDM), a combination thereof, and/or variations thereof. In addition, the baseband processing module may also utilize a scrambling scheme, an encoding scheme, a data puncture scheme, an interleaving scheme, space-time-frequency encoding, a beamforming scheme, a frequency to time domain conversion, and/or a combination thereof to produce the outbound symbol stream.

The transmitter section converts the outbound symbol stream into an outbound MMW signal that has a carrier frequency within a given frequency band (e.g., 57-66 GHz, or any other in the microwave frequency range of 3-300 GHz.). In an embodiment, this may be done by mixing the outbound symbol stream with a local oscillation to produce an up-converted signal. One or more power amplifiers and/or power amplifier drivers amplifies the up-converted signal, which may be MMW bandpass filtered, to produce the outbound MMW signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted MMW signal, which is transmitted as the outbound MMW signal. In another embodiment, the outbound symbol stream includes amplitude information (e.g., $A(t)$ [amplitude modulation]), which is used to adjust the amplitude of the phase adjusted MMW signal to produce the outbound MMW signal.

In yet another embodiment, the transmitter section includes an oscillator that produces an oscillation. The outbound symbol provides frequency information (e.g., $+/-\Delta f$ [frequency shift] and/or $f(t)$ [frequency modulation]) that adjusts the frequency of the oscillation to produce a frequency adjusted MMW signal, which is transmitted as the outbound MMW signal. In another embodiment, the outbound symbol stream includes amplitude information, which is used to adjust the amplitude of the frequency adjusted MMW signal to produce the outbound MMW signal. In a further embodiment, the transmitter section includes an oscillator that produces an oscillation. The outbound symbol provides amplitude information (e.g., $+/-\Delta A$ [amplitude shift] and/or $A(t)$ [amplitude modulation) that adjusts the amplitude of the oscillation to produce the outbound MMW signal.

Regardless of how the outbound MMW signal is generated, it is transmitted via one or more of the antennas to the MMW transceiver 12 of the apparatus 18. The receiver section of the MMW transceiver 12 receives the outbound MMW transceiver via one or more antennas and amplifies the MMW signal to produce an amplified inbound MMW signal. The receiver section may then mix in-phase (I) and quadrature (Q) components of the amplified inbound MMW signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the received MMW signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The baseband processing module converts the inbound symbol stream into inbound data (e.g., recovers the upcoming task message) in accordance with the data modulation scheme and the channel usage scheme. In addition to demodulating the inbound symbol stream, the baseband processing module may also utilize a descrambling scheme, a decoding scheme, a data de-puncture scheme, a de-interleaving scheme, space-time-frequency decoding, a time to frequency domain conversion, and/or a combination thereof to produce the inbound data. The baseband processing module provides the upcoming task message to the processing module 15.

The processing module 15 determines required resources for one or more upcoming tasks from the upcoming task message. The processing module 15 then determines the resource availability of the requesting IC and/or one or more of its processing resources (e.g., first available resources). The processing module then compares the first available resources with the required resources (e.g., the resources needed to complete the task at a desired efficiency level for the requesting IC and/or its resource(s) in view of the desired efficiency of the device and/or of a collection of ICs).

When the comparison of the first available resources with the required resources is unfavorable (e.g., the first available resources cannot complete the task at the desired efficiency level for the requesting IC and/or its resource(s) in view of the desired efficiency of the device and/or of a collection of ICs), the processing module 15 determines second available resources within a second topographical circuit area (e.g., resources in other ICs). The processing module 15 then determines whether a combination of the first and second available resources compares favorably with the required resources (e.g., whether a combination of the resources can complete the task at the desired efficiency level for the requesting IC and/or its resource(s) in view of the desired efficiency of the device and/or of a collection of ICs). When the combination of the first and second available resources compares favorably with the required resources, the processing module 15 generates a request message to access at least some of the second available resources.

The processing module 15 provides the request message to the MMW transceiver 12, which converts the request message into a MMW signal as previously discussed. The MMW transceivers associated with the addressed ICs recaptures the request message and provides it to one or more of the resources of the IC and/or to an IC resource control module. The one or more of the resources and/or the IC resource control module processes the request message to generate a response message (e.g., its availability and/or a granting of access). The response message is converted into a MMW signal by the associated MMW transceiver and transmitted to the MMW transceiver 12 of the apparatus 18.

The MMW transceiver 12 of apparatus 18 recaptures the response message and provides it to the processing module 15. The processing module 15 processes the response message to coordinate allocation of resources to execute the upcoming tasks in an efficient manner for the IC, for a collection of ICs, and/or for the device.

FIG. 2 is a logic diagram of an embodiment of a method for sharing resources that begins at step 26 where the processing module 15 of the apparatus 18 determines required resources for one or more upcoming tasks. For example, a task may be to render a screen shot of a display, to compress a signal into a different format, perform an ALU function, store data, write data, retrieve instructions, store instructions, enabling functions, disabling functions, and/or any other activity which requires processing of data, processing of instructions, storing of data, writing of data, storing of instructions, and/or writing of instructions. The resources needed to perform the upcoming task may include one or more processing resources and/or one or more memory resources. For instance, a task may have processing requirements of X cycles of a processor and memory requirements of Y Mbytes of memory for Z cycles. In this example, the processing module determines that one or more processing resources can fulfill the processing requirements and that one or more memory resources can fulfill the memory requirements for the given task. Such a determination may be done by receiving the specific resources requirements from an IC or processing resource initially charged with performing the task or via a table lookup where the table lists the resources needed for each of a plurality of tasks.

The method continues at step 28 where the processing module 15 determines available resources within a first topographical circuit area. The first topographical circuit area may include an area within a single IC, a region on a given printed circuit board that includes multiple ICs, an entire printed circuit board ((PCB) and the ICs on the PCB, multiple PCBs of a single device and the ICs contained on the PCBs, or a region of a PCB that includes multiple ICs from several devices.

For the resources within the first topographical circuit area, the processing module 15 may determine their availability based on the resources' allocation status. The resource allocation status specifies how much of the resource is being used for a current task for a given duration and/or how much of the resource is already allocated for an up-coming task and for a corresponding duration. For example, 500 Mbytes of a 2 Gbyte memory resource will be used for the next 1.56M cycles. As another example, task A is scheduled to execute on a processing resource for the next 100 k cycles in a serial manner, thus consuming 100% of the processing resource. As yet another example, task B is scheduled to execute on a processing resource for the next 1000 k cycles in a parallel manner, thus consuming about 50% of the processing resource. In an embodiment, a task scheduler may provide a table that lists resources' current and/or pending allocations and corresponding durations. In another embodiment, the processing module 15 may generate a query message regarding resource availability that is transmitted to one or more of the resources. The addressed resources respond with a message regarding their availability and/or committed current and/or pending allocations. The processing module may coordinate with an appropriate resource agent that may be kept centrally or distributed internally in each of the resources to facilitate the query and response embodiment.

The method continues at step 30, where the processing module 15 compares the first available resources with the required resources for the one or more upcoming tasks to determine whether a desired level of resources are available and/or whether additional resources should be sought. In an embodiment, the comparison is based on prioritization objectives of the resources within a plurality of IC's. Prioritization objectives may include allocating particular resources prior to other particular resource, avoiding allocation of select resources, allocating resources in pairs (e.g. a processing resource and a companion memory resource), allocating a particular second resource only when an associated first resource has failed, and/or any other criteria to meet prioritization objectives of a device.

In another embodiment, the comparison is based on achieving more efficient usage of the resources within a plurality of ICs. More efficient usage may include lower power consumption, reducing imbalance of task loading, improving execution speed, reducing execution speed, increasing parallel processing, reducing parallel processing, and/or any other criteria for subjective improvements in performance of a device For example, a utilization imbalance exists when one processing resource is typically being used at a high capacity (e.g., greater than 60%) and another resources is typically be used at a low capacity (e.g., less than 40%). In this example, it may be more desirable to utilize the first processing resource up to some capacity threshold of utilization, such as 50%, and then to allocate the remaining task load to the other processing resource. The capacity threshold is a degree of utilization of the resource that is equal to or less than the absolute maximum capacity of the resource and may vary from resources to resource. For example, a processing resource that is battery powered may have a relatively low capacity threshold to facilitate longer battery life. The architecture of the type of resource may also factor into the capacity threshold. For example, a parallel processing resource or a processing resource with a pipeline structure to perform multiple tasks simultaneously may have a series of specified capacity thresholds.

If the comparison is favorable (e.g., the first available resources can efficiently handle the upcoming tasks and/or does so in accordance with the prioritization objectives), the method continues at step 32 where the processing module allocates at least some of the first available resources to execute the upcoming tasks. If, however, the comparison was unfavorable (e.g., the first available resources cannot handle the upcoming tasks at a desired efficiently level and/or cannot do so in accordance with the prioritization objectives), the method continues at step 34 where the processing module 15 determines second available resources within a second topographical circuit area. The second topographical circuit area is exclusive of the first topographical circuit area and may include the area within a single IC, a region on a given printed circuit board that includes multiple ICs, an entire printed circuit board ((PCB) and the ICs on the PCB, multiple PCBs of a single device and the ICs contained on the PCBs, or a region of a PCB that includes multiple ICs from several devices.

For the resources within the second topographical circuit area, the processing module 15 may determine their availability based on the resources' allocation status. The resource allocation status may specify how much of the resource is being used for a current task for a given duration and/or how much of the resource is already allocated for an up-coming task and for a corresponding duration. For example, 500 Mbytes of a 2 Gbyte memory resource will be used for the next 1.56M cycles. As another example, task A is scheduled to execute on a processing resource for the next 100 k cycles. In an embodiment, a task scheduler may provide a table that lists resources' current and/or pending allocations and corresponding durations. In another embodiment, the processing module may generate a query message regarding resource availability that is transmitted to one or more of the resources. The addressed resources respond with a message regarding their availability and/or committed current and/or pending allocations. The processing module may coordinate with an appropriate resource agent that may be kept centrally or distributed internally in each of the resources to facilitate the query and response embodiment.

The method continues at step 36 of where the processing module 15 compares a combination of first and second available resources with the required resources for the one or more upcoming tasks (e.g., does a combination of the first and second resources handle one or more of the upcoming tasks at a desired efficiently level or at least provide a better efficiency than if the first resources handles the one or more upcoming tasks by themselves). When the comparison is unfavorable, the method reverts to step 32 where processing module 15 allocates the first resources.

When the comparison is favorable, the method continues at step 38 where the processing module 15 generates a request message to access at least some of the second available resources. The MMW transceiver facilitates the messaging by converting the request message into an outbound MMW signal, which is transmitted to the second available resources and/or an apparatus associated with the second available resources. The MMW transceiver of the second available resources or the associated apparatus receives the MMW signal and recaptures the request message.

The MMW transceiver provides the request message to a second processing module of the second resources or the associated apparatus that processes the request message to determine whether to grant the request. In one scenario, if sufficient resources are available, and not allocated to other tasks in that time frame, and the utilization will fall below the capacity threshold for the resource, then the second processing module will grant the request. In another scenario, the second processing module automatically grants the request. In yet another scenario, the second processing module redirects the request message to a different processing module to consider the request. It is also possible that the second processing module will deny the request. In one example, the request will be denied if the second processing module determines that an allocation as requested will drive the resource utilization over the capacity threshold for the given resource.

Once the second processing module determines the response to the allocation request, the second processing module forms a response message and provides it to a MMW transceiver 12. The MMW transceiver 12 converts the response message into an outbound MMW signal, and transmits it to the MMW transceiver of apparatus 18. The MMW transceiver converts the inbound MMW signal into a response message and provides the response message to the processing module 15. The response message indicates a grant to the access request or some other response (e.g., denied request, partial granting, suggested alternative, etc.).

The method continues at step 40, where the processing module 15 determines if the request message to access at least some of the second available resources was granted. If the response message indicates that the request was not granted, the method continues at step 41 where the processing module 15 may continue to look for more resources in yet another topographical circuit area or use the first available resources. If, however, the response message grants access to the at least some of the second available resources, the method continues at step 42 where the processing module allocates at least some of the first available resources and the at least some of the second available resources to the one or more upcoming tasks. Allocation will queue the task for the chosen resources.

FIG. 3 is a logic diagram of an embodiment of a method for sharing resources that further discusses the comparing of the first available resources with the required resources of step 30 and begins at step 44 where the processing module determines a capacity threshold for the first available resources.

The capacity threshold is a degree of utilization of the resource that is equal to or less than the absolute maximum capacity of the resource and may vary from resources to resource. For example, a processing resource that is battery powered may have a relatively low capacity threshold (e.g. 40%) to facilitate longer battery life where a processing resource in a desktop computer may have a relatively high capacity threshold (e.g. 80%). The architecture of the type of resource may also factor into the capacity threshold. For example, a parallel processing resource or a processing resource with a pipeline structure to perform multiple tasks simultaneously may have a series of specified capacity thresholds.

The capacity threshold may be based on a variety of factors such as task prioritization (e.g. the resource may have a higher capacity threshold for some tasks relative to other queued tasks), task execution duration (e.g. the resource may have a higher capacity threshold if the task can be accomplished in few clock cycles relative to other tasks), type of resources available (e.g. the resource may have a higher capacity threshold if the resource type is more compatible with the resource type, such as fast RAM), and latency (e.g. the resource may have a higher capacity threshold if the resource can provide task completion in fewer relative cycles). The capacity threshold may be a combination of several factors as well. For example, a weighted capacity threshold may be produced by multiplying each element (e.g. prioritization, task duration, type of resource, latency, and more) of the threshold by a unique weighting factor and then adding the products and dividing by the number of elements in consideration The method continues at step 46, where the processing module determines the capacity desired for the one or more upcoming tasks. The capacity desired will summarize one or more attributes of the requirements of the tasks. The capacity desired is based on one or more of: the priority of the one or more tasks (e.g. relative to other queued tasks), execution duration of the one or more tasks (e.g. how many clock cycles), desired resources for the one or more upcoming tasks (e.g. memory or processing), and desired latency (e.g. time or cycles) for the one or more upcoming task. For example, a task may be very time critical like calculating the next frame to display on a high definition display or the task may be not so time critical like archiving an old email message. In another example, a task such as forming a coded signal may only require 10 M bytes of a memory resource for 1000 clock cycles, but a task to convert a video file from one format to another may require 30 G bytes of memory for 1M processor cycles. The aggregate of these attributes forms the capacity desired for the tasks.

The method continues at step 48 where the processing module compares the capacity with the capacity threshold. In an embodiment, one or more individual attributes of the capacity desired are compared with elements of the corresponding capacity threshold where some (e.g. every, or most, or a select few) desired capacity must fall below its corresponding capacity threshold element (e.g. desired latency of the task is compared to the latency capacity threshold of the resource, desired priority of the task is compared to the priority capacity threshold, and more). For example, if a simulation task creates a capacity desired requirement of 10 G bytes of memory and 10 M clock cycles, the comparison would be favorable if the first available resources have a memory capacity threshold of 40 G bytes and a processing capacity threshold of 100M clock cycles.

Figure 4:
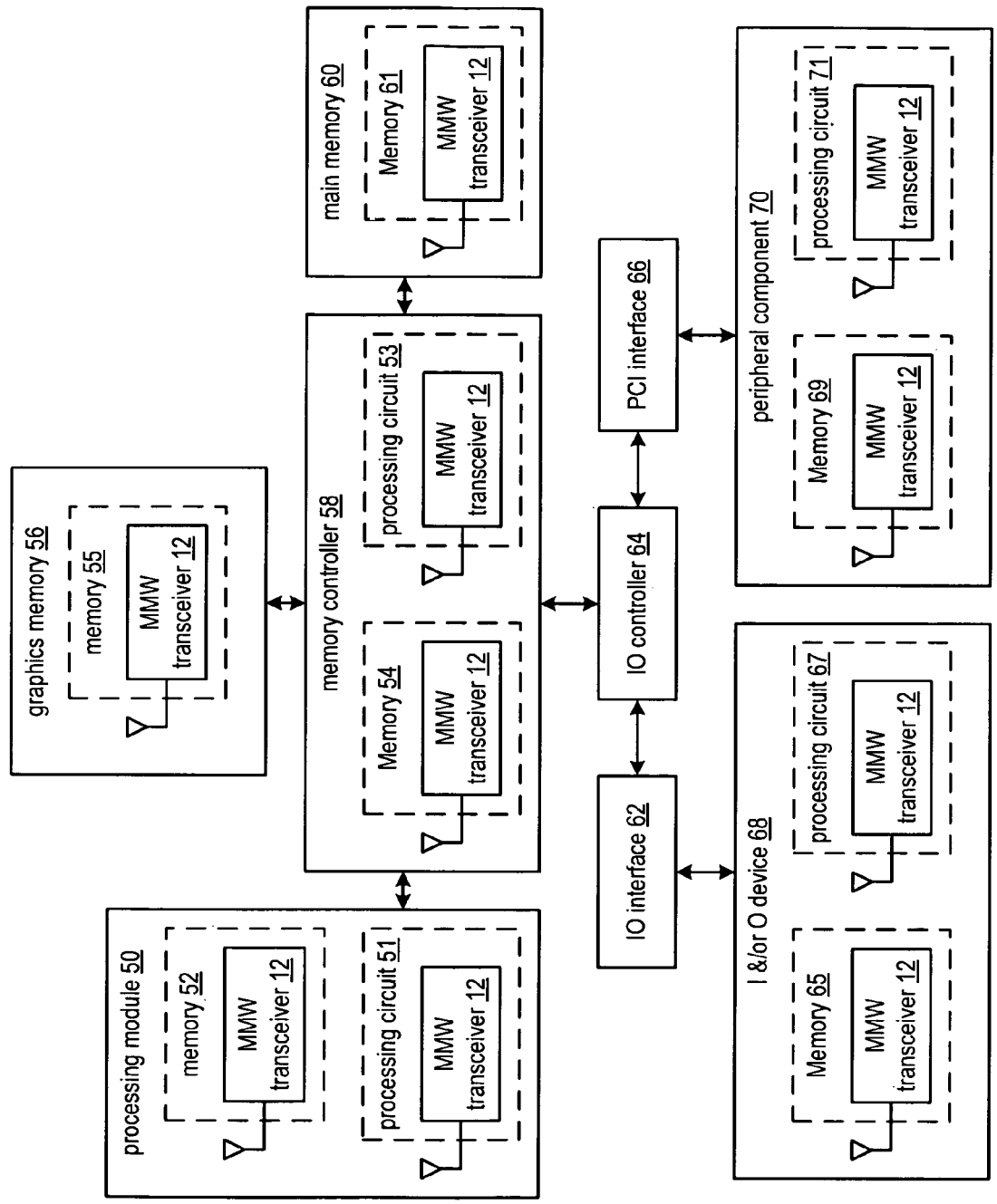
FIG. 4 is a schematic block diagram of an embodiment of a device in accordance with the invention.

FIG. 4 is a schematic block diagram of an embodiment of a device that includes a processing module 50, a graphics memory 56, a memory controller 58, a main memory 60, an input output (IO) interface 62, an input output (IO) controller 64, a peripheral component interconnect (PCI) interface 66, input and/or output (I &/or O) devices 68 (one shown), and peripheral component 70 (one shown). A device may be a portable device or a fixed device. For example, a portable device may be a cell phone, a personal digital assistant, a digital music player, a digital video player, a laptop computer, a handheld computer, a video game controller, and/or any other portable equipment that includes integrated circuits. A fixed device may be a personal computer, a cable set-top box, a satellite receiver, a television set, a printer, a fax machine, home entertainment equipment, a video game console, and/or any type of home or office equipment that includes integrated circuits.

In an embodiment, the processing module 50 is the primary processor for the device coordinating a majority of tasks (e.g., (e.g., execute one or more operation instructions of an algorithm, perform an interrupt, perform a co-processing function, process data, store data to memory, read data from memory, etc.) and includes at least one processing circuit 51, at least one memory 52, and at least one associated MMW transceiver 12. The memory controller 58 coordinates the reading of data and writing of data within the device and includes at least one memory 54, at least one processing circuit 53, and at least one associated MMW transceiver 12. For example, data for display screen renderings may be routed to and from the graphics memory 56 and data for operations may be routed to and from the main memory 60. The graphics memory 56 includes at least one memory 55 and at least one associated MMW transceiver 12 and the main memory 60 includes at least one memory 61 and at least one associated MMW transceiver 12. The type of memory used in the graphics memory 56 and main memory 60 is in accordance with the intended use.

The IO controller 64 provides access to the memory controller 58 for typically slower devices. For example, the I/O controller 64 provides functionality for the PCI components 70 via the PCI interface 66 and for IO devices 68 via the I/O interface 62. Each of the IO devices 68 includes at least one processing circuit 67, at least one memory 65, and at least one associated MMW transceiver 12 and may be a keyboard, a mouse, a printer, a removable CD/DVD disk drive, a BIOS interface, and/or any other I/O device.

Each of the peripheral components 70 includes at least one memory 69, at least one processing circuit 71, and at least one associated MMW transceiver 12. and may be a removable CD/DVD disk drive, a BIOS interface, flash memory, a disk array controller, a direct memory access (DMA) controller, an interrupt controller, a host controller, a real time clock, an audio interface, an Ethernet network card, a Redundant Arrays of Inexpensive Disks (RAID), a USB interface, a FireWire interface, a WLAN transceiver, a sound card, an infrared (IR) transceiver, a television (TV) tuner, a video processing module, one or more memory expansion cards, and/or any other computer peripheral device.

The IO interface 62, 10 controller 64, and PCI interface 66 may each include at least one processing circuit that is similar to processing circuit 51, 53, 67, 71, and may include at least one memory that similar to memory 52, 54, 55, 61, 65, 69. Processing circuit 51, 53, 67, 71, and memory 52, 54, 55, 61, 65, 69 each includes at least one MMW transceiver 12. For example, Each of the processing circuit 51, 53, 67, 71 may be one or more of a microprocessor, microprocessor array, micro-controller, digital signal processor, a microcomputer, central processing unit, field programmable gate array, programmable logic device, state machine, logic circuitry, analog circuitry, digital circuitry, a floating point arithmetic logic unit (ALU), a fixed point ALU, a multiplier, an adder, a shift register, an accumulator, a delay, a register, and/or any device that manipulates signals (analog and/or digital) based on hard coding of the circuitry and/or operational instructions. The processing circuit may have an associated memory and/or memory element, which may be a single memory device, a plurality of memory devices, and/or embedded circuitry of the processing circuit. Such a memory device may be a read-only memory, random access memory, volatile memory, non-volatile memory, static memory, dynamic memory, flash memory, cache memory, and/or any device that stores digital information. Note that when the processing circuit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

As another example, each of the memories 52, 54, 55, 61, 65, 69 may be one or more of a read-only memory, random access memory, volatile memory, non-volatile memory, static memory, dynamic memory, flash memory, cache memory, and/or any device that stores digital information. As a further example, memory 65 may be 100 M bytes of static RAM memory to cache data for an IO device 68 while memory 61 of main memory 60 may be 32 G bytes of dynamic RAM memory to store temporary results of the manipulation of large amounts of data.

(Gary—don't need this since we are talking about transceiver 12, which we have already discussed. There is a fine line here as to when to repeat text. Typically, if it is a straight repeat, I don't do it, except for parenthetical examples (See tasks in the first or second paragraph of this figure), which you want to be an exact cut and paste. If there is a little something new that is being discussed, the something new should be the focal point of the discussion, pulling the already discussed stuff as needed to make the new stuff make sense.)

In an example of operation, the processing module 50 communicates with one or more of the graphics memory 56, the memory controller 58, the main memory 60, the IO interface 62, the IO controller 64, the PCI interface 66, the I &/or O device 68, and the peripheral component 70 to coordinate resource usage for one or more upcoming tasks that are typically performed by the processing module 50 or one of the other modules 56-70. In this regard, the processing module 50 determines what resources are required for the one or more upcoming tasks, determines available resources of the processing module 50 and of the other components 56-70, and allocates the resources that will support the tasks in a desired way. The processing circuit 51 and the processing circuits 53, 67, 71, and memory 52, 54, 55, 61, 65, 69 communicate resource availability information and resource allocation information via messages conveyed by the MMW transceivers 12. The messages may include a request for resource availability information, a request for the allocation of a resource, resource availability information, a resource request grant, and/or data used and/or produced by a resource.

As an example, one or more of the processing circuits 51, 53, 67, 71 has a plurality of upcoming tasks (e.g., execute one or more operation instructions of an algorithm, perform an interrupt, perform a co-processing function, process data, store data to memory, read data from memory, etc.) The one or more processing circuits 51, 53, 67, 71 communicates its upcoming tasks to the processing module 50, which may be a single device implemented as a stand-alone IC or a distributed device with components (e.g., separate processing circuit 51, memory 52, and MMW transceiver 12) implemented within two or more ICs.

The one or more processing circuits 51, 53, 67, 71 may communicate its upcoming tasks via a MMW message or other means of communication (e.g., for processing circuit 51 via an IC and/or PCB trace). For instance, the one or more processing circuits 51, 53, 67, 71, or a designated representative thereof (e.g., one of the processing circuits or an IC resource control module assigned to facilitate resource sharing), generates a message containing the upcoming tasks. The message identifies the particular tasks and may further include the requirements for performing the task (e.g., processing requirements and/or memory requirements). The message is conveyed to an associated MMW transceiver 12 of the processing module 50.

(Don't need to repeat this, exact same as before with same reference numbers)

The transmitter section converts the outbound symbol stream into an outbound MMW signal that has a carrier frequency within a given frequency band (e.g., 57-66 GHz, or any other in the microwave frequency range of 3-300 GHz.).

The outbound MMW signal is transmitted via one or more of the antennas to the MMW transceiver 12 of the processing module 50. The receiver section of the MMW transceiver 12 receives the outbound MMW transceiver via one or more antennas and amplifies the MMW signal to produce an amplified inbound MMW signal.

The baseband processing module converts the inbound symbol stream into inbound data (e.g., recovers the upcoming task message) in accordance with the data modulation scheme and the channel usage scheme.

The processing module 50 determines required resources for one or more upcoming tasks from the upcoming task message. The processing module 50 then determines the resource availability of the requesting IC and/or one or more of its processing resources (e.g., first available resources). The processing module 50 then compares the first available resources with the required resources (e.g., the resources needed to complete the task at a desired efficiency level for the requesting IC and/or its resource(s) in view of the desired efficiency of the device and/or of a collection of ICs).

When the comparison of the first available resources with the required resources is unfavorable (e.g., the first available resources cannot complete the task at the desired efficiency level for the requesting IC and/or its resource(s) in view of the desired efficiency of the device and/or of a collection of ICs), the processing module 50 determines second available resources within a second topographical circuit area (e.g., resources in other ICs). The processing module 50 then determines whether a combination of the first and second available resources compares favorably with the required resources (e.g., whether a combination of the resources can complete the task at the desired efficiency level for the requesting IC and/or its resource(s) in view of the desired efficiency of the device and/or of a collection of ICs). When the combination of the first and second available resources compares favorably with the required resources, the processing module 50 generates a request message to access at least some of the second available resources.

The processing circuit 51 of the processing module 50 provides the request message to the MMW transceiver 12, which converts the request message into a MMW signal as previously discussed. The MMW transceivers associated with the addressed ICs recaptures the request message and provides it to one or more of the resources of the IC and/or to an IC resource control module. The one or more of the resources and/or the IC resource control module processes the request message to generate a response message (e.g., its availability and/or a granting of access). The response message is converted into a MMW signal by the associated MMW transceiver and transmitted to the MMW transceiver 12 of the processing module 50.

The MMW transceiver 12 of processing module 50 recaptures the response message and provides it to the processing circuit 51. The processing circuit 51 processes the response message to coordinate allocation of resources to execute the upcoming tasks in an efficient manner for the IC, for a collection of ICs, and/or for the device.

In one embodiment, the MMW transceiver 12 supports communications and/or resource allocations. For example, processing circuit 51 of processing module 50 performs the resource allocation steps and the associated MMW transceiver 12 communicates the resource allocation messages while the MMW transceiver 12 in main memory 60, where there is no dedicated processing circuit, may control the allocation of memory 61.

As an example of operation, the processing module 50 may have a data manipulation task to perform. The processing circuit 51 determines the required resources (e.g., 2 G bytes of memory and 1M cycles of processing time) based on the data manipulation task to be performed. The processing circuit 51 then determines the resource availability within first available resources (e.g., processing module 50 and main memory 60). This information may be known, accessed via a table look up, or may be obtained by communicating a request for resource availability message via the MMW transceivers. The resources will send a response message containing availability information (e.g., 1 G byte of memory in memory 52 and 10 G bytes of memory in memory 61; 500 k cycles of processing time in processing circuit 51). The processing circuit 51 then compares the available resources to the required resources.

When the comparison of the first available resources (e.g., memory 52, memory 62, and processing circuit 51) with the required resources is unfavorable (e.g., the first available resources cannot complete the task at the desired efficiency level for the requesting IC and/or its resource(s) in view of the desired efficiency of the device and/or of a collection of ICs), the processing circuit 51 determines second available resources within a second topographical circuit area (e.g., processing circuit 67 of I0 device 68) by communicating a request for resource availability message via the MMW transceivers. The processing circuit 67 sends a response message containing availability information (e.g., 1.5M cycles of processing time).

The processing circuit 51 then determines whether a combination of the first and second available resources compares favorably with the required resources (e.g., whether a combination of the resources can complete the task at the desired efficiency level for the requesting IC and/or its resource(s) in view of the desired efficiency of the device and/or of a collection of ICs). In this example, processing circuit 67 has more than enough processing cycles available to meet the requirements of the task (e.g., 1.5 M cycles available for a task requiring 1 M cycles). When the combination of the first and second available resources compares favorably with the required resources, the processing circuit 51 generates a request message to access the second available resources (e.g., processing circuit 67).

The processing circuit 51 of the processing module 50 provides the request message to the MMW transceiver 12, which converts the request message into a MMW signal as previously discussed. The MMW transceivers associated with the addressed ICs recaptures the request message and provides it to one or more of the resources of the IC and/or to an IC resource control module (e.g., processing circuit 67). The processing circuit 67 processes the request message to generate a response message (e.g., a granting of access). The response message is converted into a MMW signal by the associated MMW transceiver and transmitted to the MMW transceiver 12 of the processing circuit 51.

The MMW transceiver 12 of processing circuit 51 recaptures the response message. The processing circuit 51 processes the response message to coordinate allocation of resources to execute the upcoming tasks in an efficient manner for the IC, for a collection of ICs, and/or for the device (e.g. 100 k bytes of memory 52, 1.9 G bytes of memory 61, 0 cycles of processor 51, and 1 M cycles of processor 67).

FIG. 5 is an example of a set of tables of an embodiment of the device of FIG. 4 used for sharing resources amongst the resources of the device. Table 1 contains data to characterize required resources for one or more upcoming tasks. For instance, the characterization may include processing requirements, memory requirements, and a parallel or serial instruction processing indicator. A task with a parallel instruction indicator is capable of simultaneous and/or contiguous execution by two or more processors while a task with a serial instruction indicator is executed by one processor at a time. Processing requirements may be expressed as processor cycles such as the CPU cycles of a microprocessor while the memory requirements may be expressed as memory bytes. As an example, task A1 may convert a file from one format to another and require 1.3 M serial processing cycles, and 100 M bytes of memory to execute the process.

As an example of operation, processing circuit 51 determines the required resources for upcoming task A2 by looking up the characterization of task A2 in Table 1. Table 1 indicates that task A2 can be executed with parallel processing and will require 10 M processing cycles and 1.1 G bytes of memory. Processing circuit 51 will compare the required resources to an available resource in a subsequent step.

Table 2 contains data to characterize resource capabilities and can be used to determine a capacity threshold for an available resource. The capacity threshold is a desired limit at which the resource may be utilized for task reallocation, which may be a different threshold (e.g., lower) than its capacity for performing tasks. As shown, a resource may contain processing capabilities and/or memory capabilities. Processing capabilities may be expressed as processor cycles per second (cps) such as the CPU cycles of a microprocessor while the memory capability can be expressed as memory size in bytes. Indexing into Table 2 is by resource. For instance, an index is expressed as a combination of a granular package number (e.g., an IC, an apparatus, a device, or some other package descriptor) and circuit component number. For example, processing module 50 memory 52 has a designation of 50-52 and has a memory threshold size of 1.0 G bytes and processing module 50 processing circuit 51 has a designation of 50-51 and has a processor threshold speed of 2.0 gigacycles-per-second.

As an example of operation, processing circuit 51 determines the capacity threshold for processing circuit 53 of memory controller 58 by looking up the capacity threshold in Table 2. Table 2 indicates that processing circuit 53 of memory controller 58 has a processing capacity threshold of 3.3 G cycles per second. Processing circuit 51 will compare the required resources to the capacity threshold of an available resource in a subsequent step.

Table 3 contains resource allocation data indicating the task execution status of a resource. The data in Table 3 indicates which task is running on a resource and how many more cycles to completion of the task, if a task is queued to run on a resource, and/or if a resource is idle. In an embodiment, processing circuit 51 can determine a resource to allocate to an upcoming task based on when the resource will be available. In an example, at time t1, resource 70-71 is not executing a task and is idle, resource 58-53 is executing task A1 and will complete in 425 k processor cycles, and resource 50-51 is queued to start task B2 when task A2 completes in 5.01 M processor cycles.

FIGS. 6-8 are diagrams of an example embodiment of task allocation of the device of FIG. 4 to share resources amongst the resources of the device. In this example, processing module 50 determines required resources for one or more upcoming tasks that are scheduled for execution by looking up the task execution characteristics in Table 1. In an example, tasks A1, A2, B1, B2, and B3 are to be executed. Processing module 50 determines from Table 1 that task A1 will require 1.3M processor cycles, 100 M bytes of memory, and should be executed serially by one processor; task A2 will require 10M processor cycles, 1.1 G bytes of memory, and can be executed in parallel by two or more processors; task B1 will require 20M processor cycles, 5 M bytes of memory, and can be executed in parallel by two or more processors; task B2 will require 25M processor cycles, 7 M bytes of memory, and can be executed in parallel by two or more processors; and task B3 will require 30M processor cycles, 9 M bytes of memory, and should be executed serially by one processor.

FIG. 6 is a diagram of task allocation if all of the tasks are to be performed by the processing module 50. In this example, processing module 50 determines the requirements of tasks A1, A2, B1, B2, and B3 and creates a task allocation plan based on the task requirements and resource capabilities. The allocation plan includes: task A1 starts first, will execute alone, and will exceed the desired capacity threshold of processing module 50 (e.g., 90%); tasks A2 and B1 will start when A1 concludes, will run in parallel with each other, and will not exceed the desired capacity threshold for processing module 50; task B2 will start when task A2 concludes, will run in parallel with task B1, and will not exceed the desired capacity threshold for processing module 50; task B2 will run alone when task B1 concludes, will utilize processing module 50 capacity below the desired capacity threshold, and will not run in parallel with the next queued task B3 since task B3 runs serially; task B3 will start when task B2 concludes, will execute alone, and will exceed the desired capacity threshold of processing module 50. Since, in this example, task A1 and B3 exceed the desired threshold, processing module 50 may seek more resources from other components and/or modules of the device to support one or more of these tasks.

FIGS. 7&8 are diagrams of task allocation using additional resources (e.g., resources beyond those of processing module 50). In an example, processing module 50 determines that tasks B1, A2, and B2 can run on processing module 50, as shown in FIG. 7 without exceeding the desired capacity threshold for processing module 50 and a second set of resources are desired to execute tasks A1 and B3 to avoid exceeding the desired capacity threshold of processing module 50. Processing module 50 determines the availability of more resources by looking up the resource allocations in Table 3. Processing module 50 determines that task A1 can be processed by the resources of the memory controller 58 and that task B3 can be processed by the I/O device 68 without exceeding their respective desired capacity thresholds as illustrated by FIG. 8. As such, by leveraging idle and/or under-utilized resources of other components or modules within a device or collection of ICs, the overall efficient of the device and/or collection of ICs can be improved.

Figure 9:
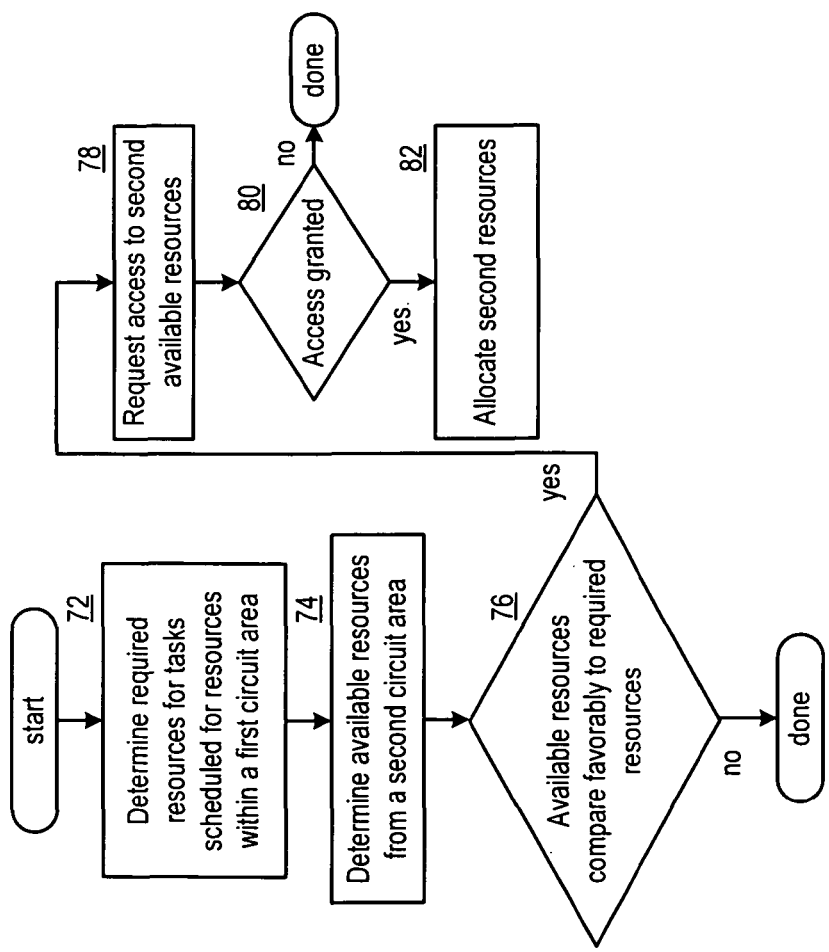
FIG. 9 is a logic diagram of another embodiment of a method for sharing resources in accordance with the invention.

FIG. 9 is a logic diagram of another embodiment of a method for sharing resources that begins at step 72 where the processing module 50 determines required resources for one or more upcoming tasks that are scheduled for execution by resources within a first topographical circuit area. The first topographical circuit area may include an area within a single IC, a region on a given printed circuit board that includes multiple ICs, an entire printed circuit board ((PCB) and the ICs on the PCB, multiple PCBs of a single device and the ICs contained on the PCBs, or a region of a PCB that includes multiple ICs from several devices. For example, a task may be to render a screen shot of a display, to compress a signal into a different format, perform an ALU function, store data, write data, retrieve instructions, store instructions, enabling functions, disabling functions, and/or any other activity which requires processing of data, processing of instructions, storing of data, writing of data, storing of instructions, and/or writing of instructions. The resources needed to perform the upcoming task may include one or more processing resources and/or one or more memory resources. For instance, a task may have processing requirements of X cycles of a processor and memory requirements of Y Mbytes of memory for Z cycles. In this example, the processing module 50 determines that one or more processing resources can fulfill the processing requirements and that one or more memory resources can fulfill the memory requirements for the given task. Such a determination may be done by accessing a table that includes a listing of resources needed for each of a plurality of tasks and/or receiving a request to off-load at least one of the one or more upcoming tasks.

The method continues at step 74 where the processing module 50 determines available resources within a second topographical circuit area. The second topographical circuit area is exclusive of the first topographical circuit area and may include the area within a single IC, a region on a given printed circuit board that includes multiple ICs, an entire printed circuit board ((PCB) and the ICs on the PCB, multiple PCBs of a single device and the ICs contained on the PCBs, or a region of a PCB that includes multiple ICs from several devices.

Processing module 50 may determine availability of resources in the second topographical circuit area by accessing a table that includes a listing of resources within the second topographical circuit area and an indication for each of the resources whether it is currently allocated to execute one of a plurality of tasks or is currently available. The resource allocation status may specify how much of the resource is being used for a current task for a given duration and/or how much of the resource is already allocated for an up-coming task and for a corresponding duration. For example, 500 Mbytes of a 2 Gbyte memory resource will be used for the next 1.56M cycles. As another example, task A is scheduled to execute on a processing resource for the next 100 k cycles. In another embodiment, the processing module 50 may generate a query message regarding availability and receive a response message regarding availability, wherein the query message is transmitted by the MMW transceiver and the response message is received by the MMW transceiver.

The method continues at step 76, where the processing module 15 compares the available resources from the second topographical circuit area with the required resources for the one or more upcoming tasks to determine whether a desired level of resources are available. In an embodiment, the comparison is based on prioritization objectives of the resources within a plurality of IC's. Prioritization objectives may include allocating particular resources prior to other particular resource, avoiding allocation of select resources, allocating resources in pairs (e.g. a processing resource and a companion memory resource), allocating a particular second resource only when an associated first resource has failed, and/or any other criteria to meet prioritization objectives of a device.

In another embodiment, the comparison is based on achieving more efficient usage of the resources within a plurality of ICs. More efficient usage may include lower power consumption, reducing imbalance of task loading, improving execution speed, reducing execution speed, increasing parallel processing, reducing parallel processing, and/or any other criteria for subjective improvements in performance of a device For example, a utilization imbalance exists when one processing resource is typically being used at a high capacity (e.g., greater than 60%) and another resources is typically be used at a low capacity (e.g., less than 40%). In this example, it may be more desirable to utilize the first processing resource up to some capacity threshold of utilization, such as 50%, and then to allocate the remaining task load to the other processing resource. The capacity threshold is a degree of utilization of the resource that is equal to or less than the absolute maximum capacity of the resource and may vary from resources to resource. For example, a processing resource that is battery powered may have a relatively low capacity threshold to facilitate longer battery life. The architecture of the type of resource may also factor into the capacity threshold. For example, a parallel processing resource or a processing resource with a pipeline structure to perform multiple tasks simultaneously may have a series of specified capacity thresholds.

If the comparison is unfavorable (e.g., the available resources do not achieve the desired objectives), the method ends and no change occurs to the plan to execute the tasks that are scheduled for execution by resources within the first topographical circuit area. When the comparison is favorable, the method continues at step 78 where the processing module 50 generates a request message to access at least some of the second available resources. The MMW transceiver facilitates the messaging by converting the request message into an outbound MMW signal, which is transmitted to the second available resources and/or an apparatus associated with the second available resources. The MMW transceiver of the second available resources or the associated apparatus receives the MMW signal and recaptures the request message.

The MMW transceiver provides the request message to a second processing module of the second resources or the associated apparatus that processes the request message to determine whether to grant the request. In one scenario, if sufficient resources are available, and not allocated to other tasks in that time frame, and the utilization will fall below the capacity threshold for the resource, then the second processing module will grant the request. In another scenario, the second processing module automatically grants the request. In yet another scenario, the second processing module redirects the request message to a different processing module to consider the request. It is also possible that the second processing module will deny the request. In one example, the request will be denied if the second processing module determines that an allocation as requested will drive the resource utilization over the capacity threshold for the given resource.

Once the second processing module determines the response to the allocation request, the second processing module forms a response message and provides it to a MMW transceiver 12. The MMW transceiver 12 converts the response message into an outbound MMW signal, and transmits it to the MMW transceiver of processing module 50. The MMW transceiver converts the inbound MMW signal into a response message and provides the response message to the processing module 50. The response message indicates a grant to the access request or some other response (e.g., denied request, partial granting, suggested alternative, etc.).

The method continues at step 80, where the processing module 50 determines if the request message to access at least some of the second available resources was granted. If the response message indicates that the request was not granted, the method ends and no change occurs to the plan to execute the tasks that are scheduled for execution by resources within the first topographical circuit area. If, however, the response message grants access to the at least some of the second available resources, the method continues at step 82 where the processing module 50 allocates at least some of the second available resources to the one or more upcoming tasks. Allocation will queue the task for the chosen resources.

Figure 10:
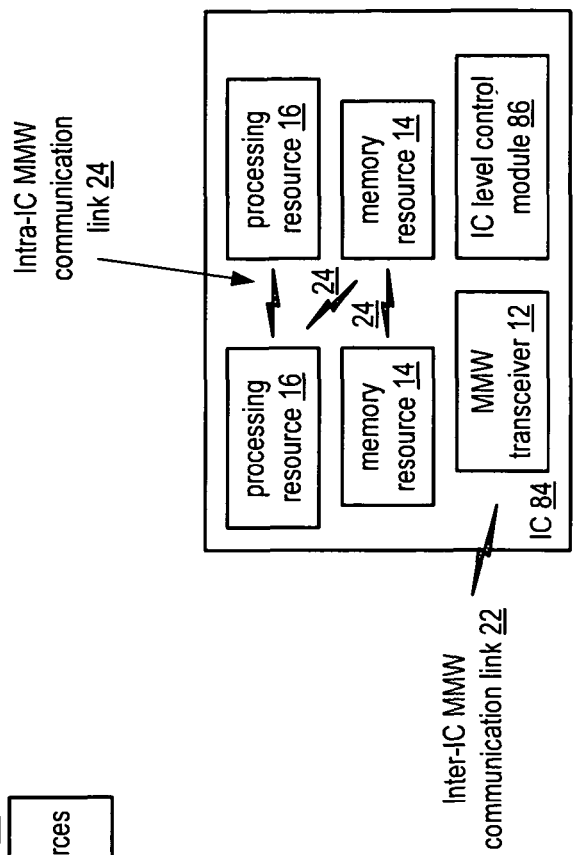
FIG. 10 is a schematic block diagram of an embodiment of an integrated circuit in accordance with the invention.

FIG. 10 illustrates a schematic block diagram of an embodiment an integrated circuit 84 that includes sharable resources, at least one MMW transceiver 12, and an IC level control module 86. A sharable resource may include one or more processing resources 16 and/or one or more memory resources 14 and can communicate with each other over an intra-IC MMW communication link 24 and with resources outside of the IC via inter-IC MMW communication link 22. The IC level control module 86 coordinates resource allocation requests for the resources of the IC. For example, the IC level control module 86 may perform the method of FIG. 11 to coordinate the allocation of resources to tasks.

FIG. 11 is a logic diagram of another embodiment of a method for sharing resources that begins at step 88 where the IC level control module 86 of the IC 84 determines required resources for one or more upcoming tasks. For example, a task may be to render a screen shot of a display, to compress a signal into a different format, perform an ALU function, store data, write data, retrieve instructions, store instructions, enabling functions, disabling functions, and/or any other activity which requires processing of data, processing of instructions, storing of data, writing of data, storing of instructions, and/or writing of instructions. The resources needed to perform the upcoming task may include one or more processing resources and/or one or more memory resources. For instance, a task may have processing requirements of X cycles of a processor and memory requirements of Y Mbytes of memory for Z cycles. In this example, the IC level control module 86 determines that one or more processing resources can fulfill the processing requirements and that one or more memory resources can fulfill the memory requirements for the given task. Such a determination may be done by accessing a table that includes a listing of resources needed for each of a plurality of tasks and/or by receiving a request for additional resources for the one or more upcoming tasks The method continues at step 90, where the IC level control module 86 determines first available resources within a first and second topographical circuit area. The first and second topographical circuit areas are exclusive of each other. The first and second topographical circuit areas may include an area within a single IC, a region on a given printed circuit board that includes multiple ICs, an entire printed circuit board ((PCB) and the ICs on the PCB, multiple PCBs of a single device and the ICs contained on the PCBs, or a region of a PCB that includes multiple ICs from several devices. In a specific example, the first topographical circuit area includes the components within IC 84 of FIG. 10 and the second topographical circuit area includes components in one or more other ICs.

The IC level control module 86 may determine resource availability by accessing a task scheduler table that includes a listing of resources of the first and second topographical circuit areas and an indication for each of the resources whether it is currently allocated to execute one of a plurality of tasks or is currently available and/or by generating a query message regarding availability and receive a response message regarding availability from the first and second topographical circuit areas. The resource allocation status specifies how much of the resource is being used for a current task for a given duration and/or how much of the resource is already allocated for an up-coming task and for a corresponding duration. For example, 500 Mbytes of a 2 Gbyte memory resource will be used for the next 1.56M cycles. As another example, task A is scheduled to execute on a processing resource for the next 100 k cycles in a serial manner, thus consuming 100% of the processing resource. As yet another example, task B is scheduled to execute on a processing resource for the next 1000 k cycles in a parallel manner, thus consuming about 50% of the processing resource.

The method continues at step 92, where the IC level control module 86 compares the first available resources with the required resources for the one or more upcoming tasks to determine whether a desired level of resources are available and/or whether additional resources should be sought. In an embodiment, the comparison is based on prioritization objectives of the resources within a plurality of IC's. Prioritization objectives may include allocating particular resources prior to other particular resource, avoiding allocation of select resources, allocating resources in pairs (e.g. a processing resource and a companion memory resource), allocating a particular second resource only when an associated first resource has failed, and/or any other criteria to meet prioritization objectives of a device.

In another embodiment, the comparison is based on achieving more efficient usage of the resources within a plurality of ICs. More efficient usage may include lower power consumption, reducing imbalance of task loading, improving execution speed, reducing execution speed, increasing parallel processing, reducing parallel processing, and/or any other criteria for subjective improvements in performance of a device For example, a utilization imbalance exists when one processing resource is typically being used at a high capacity (e.g., greater than 60%) and another resources is typically be used at a low capacity (e.g., less than 40%). In this example, it may be more desirable to utilize the first processing resource up to some capacity threshold of utilization, such as 50%, and then to allocate the remaining task load to the other processing resource. The capacity threshold is a degree of utilization of the resource that is equal to or less than the absolute maximum capacity of the resource and may vary from resources to resource. For example, a processing resource that is battery powered may have a relatively low capacity threshold to facilitate longer battery life. The architecture of the type of resource may also factor into the capacity threshold. For example, a parallel processing resource or a processing resource with a pipeline structure to perform multiple tasks simultaneously may have a series of specified capacity thresholds.

If the comparison is favorable (e.g., the first available resources can efficiently handle the upcoming tasks and/or does so in accordance with the prioritization objectives), the method continues at step 94 where the IC level control module 86 allocates at least some of the first available resources to execute the upcoming tasks. If, however, the comparison was unfavorable (e.g., the first available resources cannot handle the upcoming tasks at a desired efficiently level and/or cannot do so in accordance with the prioritization objectives), the method continues at step 96 where the IC level control module 86 determines second available resources within at least one other IC.

The IC level control module 86 may determine second available resources by accessing a table that includes a listing of resources within the at least one other IC and an indication for each of the resources whether it is currently allocated to execute one of a plurality of tasks or is currently available and/or by generating a query message regarding availability and receive a response message regarding availability, wherein the MMW transceiver transmits the query message to the at least one other IC and receives the response message from the at least one other IC. The resource allocation status may specify how much of the resource is being used for a current task for a given duration and/or how much of the resource is already allocated for an up-coming task and for a corresponding duration. For example, 500 Mbytes of a 2 Gbyte memory resource will be used for the next 1.56M cycles. As another example, task A is scheduled to execute on a processing resource for the next 100 k cycles The method continues at step 98, where the IC level control module 86 compares a combination of first and second available resources with the required resources for the one or more upcoming tasks (e.g., does a combination of the first and second resources handle one or more of the upcoming tasks at a desired efficiently level or at least provide a better efficiency than if the first resources handles the one or more upcoming tasks by themselves). When the comparison is unfavorable, the method may end with no resource allocations or the IC level control module 86 may allocate at least some of the first available resources in step 94.

When the comparison is favorable, the method continues at step 100 where the IC level control module 86 generates a request message to access at least some of the second available resources. The MMW transceiver facilitates the messaging by converting the request message into an outbound MMW signal, which is transmitted to the second available resources and/or an apparatus associated with the second available resources. The MMW transceiver of the second available resources or the associated apparatus receives the MMW signal and recaptures the request message.

The MMW transceiver provides the request message to a second IC level control module or second processing module of the second resources or the associated apparatus that processes the request message to determine whether to grant the request. In one scenario, if sufficient resources are available, and not allocated to other tasks in that time frame, and the utilization will fall below the capacity threshold for the resource, then the second IC level control module or second processing module will grant the request. In another scenario, the second IC level control module or second processing module automatically grants the request. In yet another scenario, the second IC level control module or second processing module redirects the request message to a different processing module to consider the request. It is also possible that the second IC level control module or second processing module will deny the request. In one example, the request will be denied if the second IC level control module or second processing module determines that an allocation as requested will drive the resource utilization over the capacity threshold for the given resource.

Once the second IC level control module or second processing module determines the response to the allocation request, the second IC level control module or second processing module forms a response message and provides it to a MMW transceiver 12. The MMW transceiver 12 converts the response message into an outbound MMW signal, and transmits it to the MMW transceiver of IC 84. The MMW transceiver converts the inbound MMW signal into a response message and provides the response message to the IC level control module 86. The response message indicates a grant to the access request or some other response (e.g., denied request, partial granting, suggested alternative, etc.).

The method continues at step 102, where the IC level control module 86 determines if the request message to access at least some of the second available resources were granted. If the response message indicates that the request was not granted, the method continues at step 103 where, the method may end with no resource allocations or the IC level control module 86 may allocate at least some of the first available resources. If, however, the response message grants access to the at least some of the second available resources, the method continues at step 104 where the IC level control module 86 allocates at least some of the first available resources to the at least some of the second available resources to the one or more upcoming tasks. Allocation will queue the task for the chosen resources.

FIG. 12 is a logic diagram of another embodiment of a method for sharing resources that further discusses the comparing of the first available resources with the required resources of step 92 and begins at step 106 where the IC level control module 86 determines a capacity threshold for the first available resources. The capacity threshold is a degree of utilization of the resource that is equal to or less than the absolute maximum capacity of the resource and may vary from resources to resource. For example, a processing resource that is battery powered may have a relatively low capacity threshold (e.g. 40%) to facilitate longer battery life where a processing resource in a desktop computer may have a relatively high capacity threshold (e.g. 80%). The architecture of the type of resource may also factor into the capacity threshold. For example, a parallel processing resource or a processing resource with a pipeline structure to perform multiple tasks simultaneously may have a series of specified capacity thresholds.

The capacity threshold may be based on a variety of factors such as task prioritization (e.g. the resource may have a higher capacity threshold for some tasks relative to other queued tasks), task execution duration (e.g. the resource may have a higher capacity threshold if the task can be accomplished in few clock cycles relative to other tasks), type of resources available (e.g. the resource may have a higher capacity threshold if the resource type is more compatible with the resource type, such as fast RAM), and latency (e.g. the resource may have a higher capacity threshold if the resource can provide task completion in fewer relative cycles). The capacity threshold may be a combination of several factors as well. For example, a weighted capacity threshold may be produced by multiplying each element (e.g. prioritization, task duration, type of resource, latency, and more) of the threshold by a unique weighting factor and then adding the products and dividing by the number of elements in consideration The method continues at step 108, where the IC level control module 86 determines the capacity desired for the one or more upcoming tasks. The capacity desired will summarize one or more attributes of the requirements of the tasks. The capacity desired is based on one or more of: the priority of the one or more tasks (e.g. relative to other queued tasks), execution duration of the one or more tasks (e.g. how many clock cycles), desired resources for the one or more upcoming tasks (e.g. memory or processing), and desired latency (e.g. time or cycles) for the one or more upcoming task. For example, a task may be very time critical like calculating the next frame to display on a high definition display or the task may be not so time critical like archiving an old email message. In another example, a task such as forming a coded signal may only require 10 M bytes of a memory resource for 1000 clock cycles, but a task to convert a video file from one format to another may require 30 G bytes of memory for 1M processor cycles. The aggregate of these attributes forms the capacity desired for the tasks.

The method continues at step 110 where the IC level control module 86 compares the capacity with the capacity threshold. In an embodiment, one or more individual attributes of the capacity desired are compared with elements of the corresponding capacity threshold where some (e.g. every, or most, or a select few) desired capacity must fall below its corresponding capacity threshold element (e.g. desired latency of the task is compared to the latency capacity threshold of the resource, desired priority of the task is compared to the priority capacity threshold, and more). For example, if a simulation task creates a capacity desired requirement of 10 G bytes of memory and 10 M clock cycles, the comparison would be favorable if the first available resources have a memory capacity threshold of 40 G bytes and a processing capacity threshold of 100M clock cycles.

Figure 13:
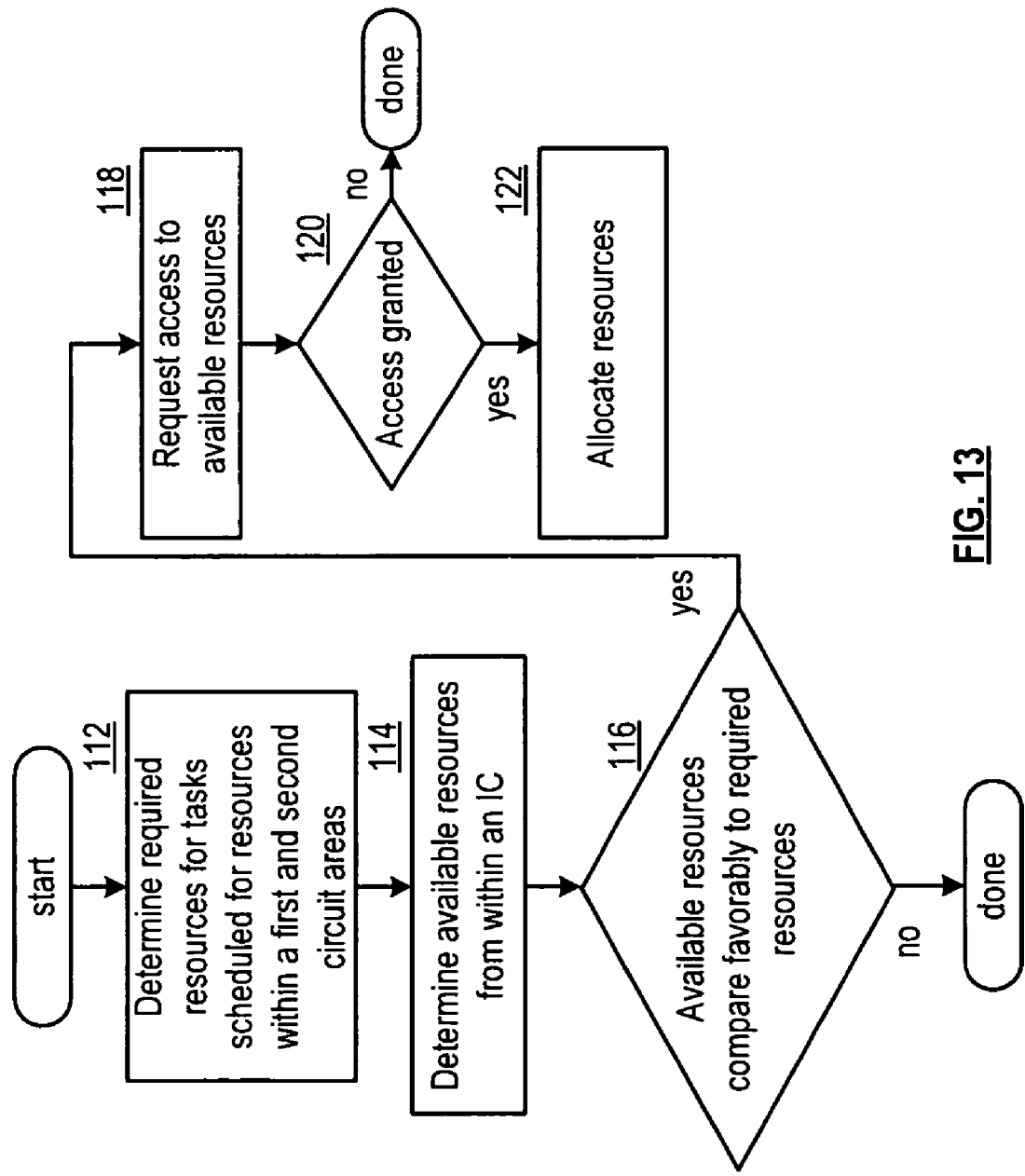
FIG. 13 is a logic diagram of another embodiment of a method for sharing resources in accordance with the invention.

FIG. 13 is a logic diagram of another embodiment of a method for sharing resources that begins at step 112 where the IC level control module 86 determines required resources for one or more upcoming tasks that are scheduled for execution by resources of at least one of a first and second circuit module. The first and second circuit modules are exclusive of each other and may include circuits within a single IC, a region on a given printed circuit board that includes multiple ICs, an entire printed circuit board ((PCB) and the ICs on the PCB, multiple PCBs of a single device and the ICs contained on the PCBs, or a region of a PCB that includes multiple ICs from several devices. For example, a task may be to render a screen shot of a display, to compress a signal into a different format, perform an ALU function, store data, write data, retrieve instructions, store instructions, enabling functions, disabling functions, and/or any other activity which requires processing of data, processing of instructions, storing of data, writing of data, storing of instructions, and/or writing of instructions. The resources needed to perform the upcoming task may include one or more processing resources and/or one or more memory resources. For instance, a task may have processing requirements of X cycles of a processor and memory requirements of Y Mbytes of memory for Z cycles. In this example, the IC level control module 86 determines that one or more processing resources can fulfill the processing requirements and that one or more memory resources can fulfill the memory requirements for the given task. Such a determination may be done by accessing a table that includes a listing of resources needed for each of a plurality of tasks and/or receiving a request to off-load at least one of the one or more upcoming tasks.

The method continues at step 114 where the IC level control module 86 determines available resources within at least one other IC. The at least one other IC is exclusive of the first and second circuit modules and may include the area within a single IC, a region on a given printed circuit board that includes multiple ICs, an entire printed circuit board ((PCB) and the ICs on the PCB, multiple PCBs of a single device and the ICs contained on the PCBs, or a region of a PCB that includes multiple ICs from several devices.

IC level control module 86 may determine availability of resources in the at least one other IC by accessing a table that includes a listing of resources within the at least one other IC and an indication for each of the resources whether it is currently allocated to execute one of a plurality of tasks or is currently available and/or by generating a query message regarding availability and receive a response message regarding availability, wherein the query message is transmitted by the MMW transceiver and the response message is received by the MMW transceiver. The resource allocation status may specify how much of the resource is being used for a current task for a given duration and/or how much of the resource is already allocated for an up-coming task and for a corresponding duration. For example, 500 Mbytes of a 2 Gbyte memory resource will be used for the next 1.56M cycles. As another example, task A is scheduled to execute on a processing resource for the next 100 k cycles.

The method continues at step 116, where the IC level control module 86 compares the available resources from the at least one other IC with the required resources for the one or more upcoming tasks to determine whether a desired level of resources are available. In an embodiment, the comparison is based on prioritization objectives of the resources within a plurality of IC's. Prioritization objectives may include allocating particular resources prior to other particular resource, avoiding allocation of select resources, allocating resources in pairs (e.g. a processing resource and a companion memory resource), allocating a particular second resource only when an associated first resource has failed, and/or any other criteria to meet prioritization objectives of a device.

In another embodiment, the comparison is based on achieving more efficient usage of the resources within a plurality of ICs. More efficient usage may include lower power consumption, reducing imbalance of task loading, improving execution speed, reducing execution speed, increasing parallel processing, reducing parallel processing, and/or any other criteria for subjective improvements in performance of a device For example, a utilization imbalance exists when one processing resource is typically being used at a high capacity (e.g., greater than 60%) and another resources is typically be used at a low capacity (e.g., less than 40%). In this example, it may be more desirable to utilize the first processing resource up to some capacity threshold of utilization, such as 50%, and then to allocate the remaining task load to the other processing resource. The capacity threshold is a degree of utilization of the resource that is equal to or less than the absolute maximum capacity of the resource and may vary from resources to resource. For example, a processing resource that is battery powered may have a relatively low capacity threshold to facilitate longer battery life. The architecture of the type of resource may also factor into the capacity threshold. For example, a parallel processing resource or a processing resource with a pipeline structure to perform multiple tasks simultaneously may have a series of specified capacity thresholds.

If the comparison is unfavorable (e.g., the available resources do not achieve the desired objectives), the method ends and no change occurs to the plan to execute the tasks that are scheduled for execution by resources of at least one of the first and second circuit modules.

When the comparison is favorable, the method continues at step 118 where the IC level control module 86 generates a request message to access at least some of the available resources. The MMW transceiver facilitates the messaging by converting the request message into an outbound MMW signal, which is transmitted to the available resources and/or an apparatus associated with the available resources. The MMW transceiver of the available resources or the associated apparatus receives the MMW signal and recaptures the request message.

The MMW transceiver provides the request message to a processing module of the available resources or the associated apparatus that processes the request message to determine whether to grant the request. In one scenario, if sufficient resources are available, and not allocated to other tasks in that time frame, and the utilization will fall below the capacity threshold for the resource, then the processing module of the available resource will grant the request. In another scenario, the processing module of the available resource automatically grants the request. In yet another scenario, the processing module of the available resource redirects the request message to a different processing module to consider the request. It is also possible that the processing module of the available resource will deny the request. In one example, the request will be denied if the processing module of the available resource determines that an allocation as requested will drive the resource utilization over the capacity threshold for the given resource.

Once the processing module of the available resource determines the response to the allocation request, the processing module of the available resource forms a response message and provides it to a MMW transceiver 12. The MMW transceiver 12 converts the response message into an outbound MMW signal, and transmits it to the MMW transceiver of IC 84. The MMW transceiver converts the inbound MMW signal into a response message and provides the response message to the IC level control module 86. The response message indicates a grant to the access request or some other response (e.g., denied request, partial granting, suggested alternative, etc.).

The method continues at step 120, where the IC level control module 86 determines if the request message to access at least some of the available resources were granted. If the response message indicates that the request was not granted, the method ends and no change occurs to the plan to execute the tasks that are scheduled for execution by resources of at least one of the first and second circuit modules. If, however, the response message grants access to the at least some of the available resources, the method continues at step 122 where the IC level control module 86 allocates at least some of the available resources to the one or more upcoming tasks. Allocation will queue the task for the chosen resources.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by infer-ence) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An apparatus comprises:
  a millimeter wave (MMW) transceiver;
  a processing module, wherein:
  the processing module is operably coupled to:
    determine required resources for one or more upcoming tasks;
    determine first available resources within a first topographical circuit area;
    compare the first available resources with the required resources;
    when the comparison of the first available resources with the required resources is unfavorable, determine second available resources within a second topographical circuit area;
    determine whether a combination of first and second available resources compares favorably with the required resources;
    when the combination of the first and second available resources compares favorably with the required resources, generate a request message to access at least some of the second available resources;
the MMW transceiver is operably coupled to:
convert the request message into an outbound MMW signal; and
convert an inbound MMW signal into a response message;
the processing module is further operably coupled to allocate at least some of the first available resources and the at least some of the second available resources to the one or more upcoming tasks when the response message grants access to the at least some of the second available resources.

2. The apparatus of claim 1, wherein the processing module is further operably coupled to determine the required resources for the one or more upcoming tasks by at least one of:
access a table that includes a listing of resources needed for each of a plurality of tasks; and
receive a request for additional resources for the one or more upcoming tasks.

3. The apparatus of claim 1, wherein the processing module is further operably coupled to determine the first available resources within the first topographical circuit area by at least one of:
access a task scheduler table that includes a listing of resources within the first topographical circuit area and an indication for each of the resources whether it is currently allocated to execute one of a plurality of tasks or is currently available; and
generate a query message regarding availability and receive a response message regarding availability.

4. The apparatus of claim 1, wherein the processing module is further operably coupled to compare the first available resources with the required resources by:
determine a capacity threshold for the first available resources, wherein the capacity threshold is based on one or more of: task prioritization, task execution duration, type of resources available, and latency;
determine capacity desired for the one or more upcoming tasks, wherein the capacity is based on one or more of: the priority of the one or more tasks, execution duration of the one or more tasks, desired resources for the one or more upcoming tasks, and desired latency for the one or more upcoming task; and
compare the capacity with the capacity threshold.

5. The apparatus of claim 1, wherein the processing module is further operably coupled to determine the second available resources within the second topographical circuit area by at least one of:
access a table that includes a listing of resources within the second topographical circuit area and an indication for each of the resources whether it is currently allocated to execute one of a plurality of tasks or is currently available; and
generate a query message regarding availability and receive a response message regarding availability, wherein the MMW transceiver transmits the query message to one or more resources with the second topographical circuit area and receives the response message from at least one of the one or more resources.

6. The apparatus of claim 1 further comprises:
the first topographical circuit area is a first integrated circuit (IC); and
the second topographical circuit is at least one other IC.

7. The apparatus of claim 6 further comprises:
the apparatus is within the first IC.

8. The apparatus of claim 1 further comprises:
the first topographical circuit area is a processing resource or a memory resource within a first integrated circuit (IC); and
the second topographical circuit area is at least one processing resource or memory resource in at least one other IC.

9. The apparatus of claim 8 further comprises:
the apparatus is associated with the processing resource or memory resource in the first IC.

10. An apparatus comprises:
a millimeter wave (MMW) transceiver;
a processing module, wherein:
the processing module is operably coupled to:
determine required resources for one or more upcoming tasks that are scheduled for execution by resources within a first topographical circuit area;
determine available resources within a second topographical circuit area;
determine whether the available resources compares favorably with the required resources;
when the available resources compares favorably with the required resources, generate a request to access to at least some of the second available resources, wherein the MMW transceiver transmits the request; and
when access to the at least some of the second available resources is granted, allocate the at least some of the second available resources to the one or more upcoming tasks, wherein the MMW transceiver received a response granting the access.

11. The apparatus of claim 10, wherein the processing module is further operably coupled to determine the required resources for the one or more upcoming tasks by at least one of:
access a table that includes a listing of resources needed for each of a plurality of tasks; and
receive a request to off-load at least one of the one or more upcoming tasks.

12. The apparatus of claim 10, wherein the processing module is further operably coupled to determine the second available resources within the second topographical circuit area by at least one of:
access a table that includes a listing of resources within the second topographical circuit area and an indication for each of the resources whether it is currently allocated to execute one of a plurality of tasks or is currently available; and
generate a query message regarding availability and receive a response message regarding availability, wherein the query message is transmitted by the MMW transceiver and the response message is received by the MMW transceiver.

13. The apparatus of claim 10 further comprises:
the first topographical circuit area is at one of a plurality of resources within a first integrated circuit (IC), wherein the plurality of resources includes at least one of processing resources and memory resources; and
the second topographical circuit area is at least one of the plurality of resources in at least one other IC.

14. An integrated circuit (IC) comprises:
a IC level control module;
a millimeter wave (MMW) transceiver;
a first circuit module; and
a second circuit module, wherein the IC level control module is operably coupled to:

determine required resources for one or more upcoming tasks;

determine first available resources of the first and second circuit modules;

compare the first available resources with the required resources;

when the comparison of the first available resources with the required resources is unfavorable, determine second available resources within at least one other IC;

determine whether a combination of first and second available resources compares favorably with the required resources;

when the combination of the first and second available resources compares favorably with the required resources, generate a request message to access at least some of the second available resources, wherein the MMW transceiver transmits the request message;

allocate at least some of the first available resources and the at least some of the second available resources to the one or more upcoming tasks when the access to the at least some of the second available resources is granted, wherein the MMW transceiver received a message granting the access.

15. The IC of claim 14, wherein the IC level control module is further operably coupled to determine the required resources for the one or more upcoming tasks by at least one of:

access a table that includes a listing of resources needed for each of a plurality of tasks; and receive a request for additional resources for the one or more upcoming tasks.

16. The IC of claim 14, wherein the IC level control module is further operably coupled to determine the first available resources of the first and second circuit modules by at least one of:

access a task scheduler table that includes a listing of resources of the first and second circuit modules and an indication for each of the resources whether it is currently allocated to execute one of a plurality of tasks or is currently available; and generate a query message regarding availability and receive a response message regarding availability from the first and second circuit modules.

17. The IC of claim 14, wherein the IC level control module is further operably coupled to compare the first available resources with the required resources by:

determine a capacity threshold for the first available resources, wherein the capacity threshold is based on one or more of: task prioritization, task execution duration, type of resources available, and latency;

determine capacity desired for the one or more upcoming tasks, wherein the capacity is based on one or more of: the priority of the one or more tasks, execution duration of the one or more tasks, desired resources for the one or more upcoming tasks, and desired latency for the one or more upcoming task; and compare the capacity with the capacity threshold.

18. The IC of claim 14, wherein the IC level control module is further operably coupled to determine the second available resources within at least one other IC by at least one of:

access a table that includes a listing of resources within the at least one other IC and an indication for each of the resources whether it is currently allocated to execute one of a plurality of tasks or is currently available; and generate a query message regarding availability and receive a response message regarding availability, wherein the MMW transceiver transmits the query message to the at least one other IC and receives the response message from the at least one other IC.

19. An integrated circuit (IC) comprises:

a IC level control module;

a millimeter wave (MMW) transceiver;

a first circuit module; and a second circuit module, wherein the IC level control module is operably coupled to:

determine required resources needed for one or more upcoming tasks that are scheduled for execution by resources of at least one of the first and second circuit modules;

determine available resources within at least more than one other IC;

determine whether the available resources compares favorably with the required resources;

when the available resources compares favorably with the required resources, generate a request to access to at least more than one of the available resources, wherein the MMW transceiver transmits the request; and when access to the at least more than one of the available resources is granted, allocate the at least more than one of the available resources to the one or more upcoming tasks, wherein the MMW transceiver receives a message granting the access.

20. The IC of claim 19, wherein the IC level control module is further operably coupled to determine the required resources for the one or more upcoming tasks by at least one of:

access a table that includes a listing of resources needed for each of a plurality of tasks; and receive a request to off-load at least one of the one or more upcoming tasks.

21. The IC of claim 19, wherein the IC level control module is further operably coupled to determine the available resources of the at least one other IC by at least one of:

access a table that includes a listing of resources within the at least one other IC and an indication for each of the resources whether it is currently allocated to execute one of a plurality of tasks or is currently available; and generate a query message regarding availability and receive a response message regarding availability, wherein the query message is transmitted by the MMW transceiver and the response message is received by the MMW transceiver.

* * * * *

UNITED STATES PATENT AND TRADEMARK OFFICE
CERTIFICATE OF CORRECTION

PATENT NO. : 8,125,950 B2  
APPLICATION NO. : 12/475504  
DATED : February 28, 2012  
INVENTOR(S) : Ahmadreza Rofougaran et al.

It is certified that error appears in the above-identified patent and that said Letters Patent is hereby corrected as shown below:

In the Claims:

Col. 27, line 45, in claim 4: after "more upcoming" replace "task" with --tasks--  
Col. 28, line 24, in claim 10: replace "to access to" with --to access--  
Col. 28, line 56, in claim 13: replace "at one of a plurality" with --at least one of a plurality--  
Col. 29, line 56, in claim 17: after "more upcoming" replace "task" with --tasks--  
Col. 30, line 28, in claim 19: replace "to access to" with --to access--

Signed and Sealed this  
Fourth Day of June, 2013

Teresa Stanek Rea  
*Acting Director of the United States Patent and Trademark Office*